United States Patent [19]
Heldenbrand

[11] 3,978,818
[45] Sept. 7, 1976

[54] LITTER PACKAGES
[76] Inventor: Ladd L. Heldenbrand, 2 Bay Road, South Portland, Maine 04106
[22] Filed: Sept. 27, 1974
[21] Appl. No.: 510,002

Related U.S. Application Data
[63] Continuation-in-part of Ser. No. 412,700, Nov. 5, 1973, abandoned.

[52] U.S. Cl. .................................................. 119/1
[51] Int. Cl.² ........................................ A01K 29/00
[58] Field of Search ........................ 119/1; 128/2 F

[56] References Cited
UNITED STATES PATENTS

| | | | |
|---|---|---|---|
| 3,059,615 | 10/1962 | Kuceski et al. ........................ | 119/1 |
| 3,227,137 | 1/1966 | Goldman et al. ....................... | 119/1 |
| 3,718,431 | 2/1973 | Wild .............................. | 128/2 F X |
| 3,774,455 | 11/1973 | Seidler et al. .................. | 128/2 F X |

Primary Examiner—J.N. Eskovitz

[57] ABSTRACT

A litter package has a body of litter within a container of waterproof material and is for use by a pet animal after the package has been opened to expose the litter substantially throughout the area of the container when disposed for use. The litter body consists of particles of absorbent material or materials that are chemically neutral when wet. Testing means are associated with the litter and of an indicator type changing color if wetted by urine containing a color-changing reactant indicating an unfavorable health condition. The testing means may be incorporated in litter material, carried on the inner surface of the container or on inserts in any case when the package is open, the testing means includes at least one unitary portion under each position the animal may occupy while urinating and of an area such as to become wetted at least in part by contact with urine-wetted particles in the normal use thereof thus to be subject to the reactant throughout a predetermined time. The indicating means may include different types of indicators, each changing color in response to different reactants, the colors being different for each reactant.

12 Claims, 9 Drawing Figures

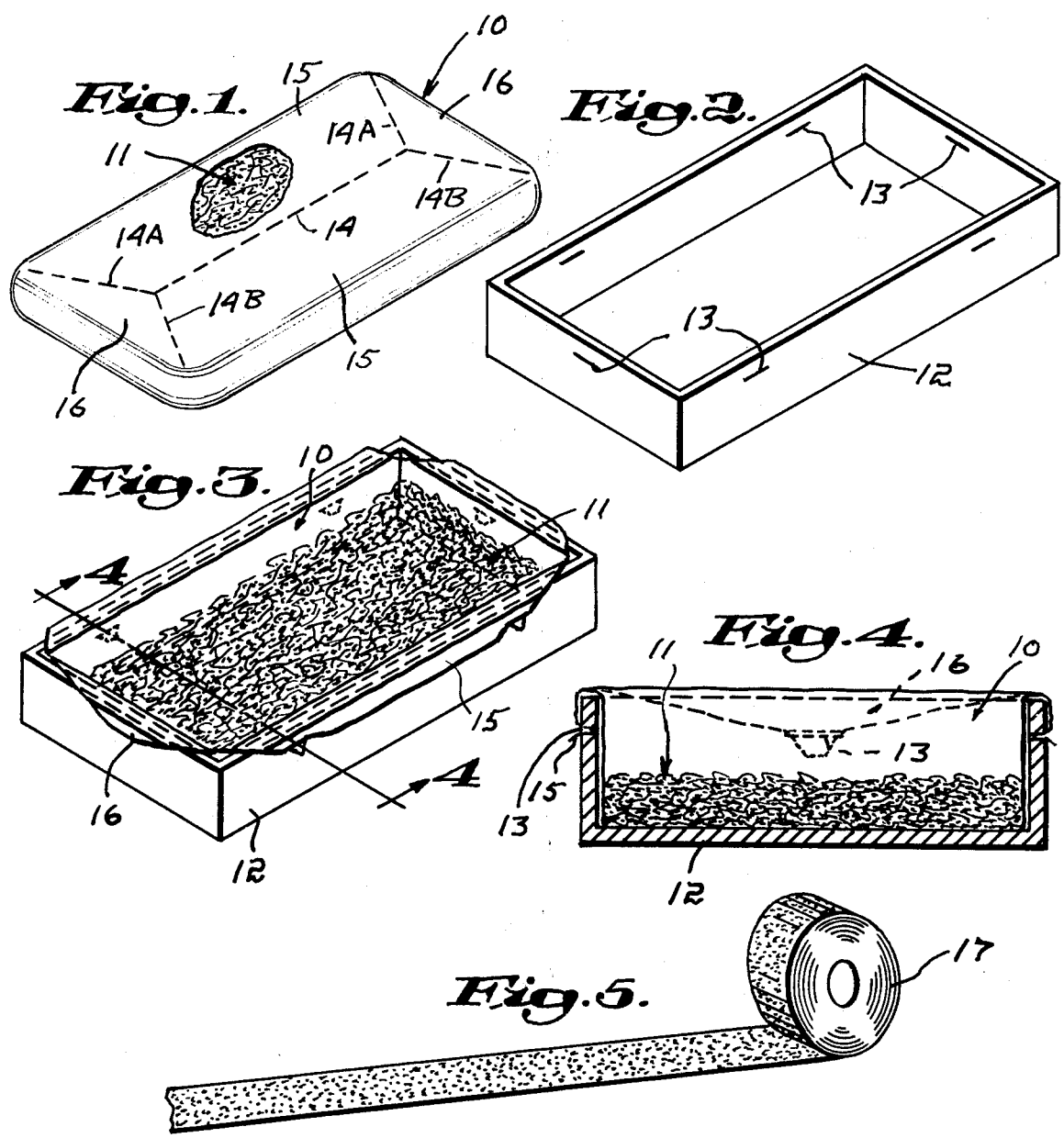

LITTER PACKAGES

The present application is a continuation-in-part of my co-pending application Ser. No. 412,700, filed Nov. 5, 1973 and now abandoned.

BACKGROUND REFERENCES

U.S. Pat. No. 2,708,418;
U.S. Pat. No. 2,029,783;
U.S. Pat. No. 3,059,615;
U.S. Pat. No. 3,358,647;
U.S. Pat. No. 3,386,417;
U.S. Pat. No. 3,449,420.

BACKGROUND OF THE INVENTION

Such household pets as dogs and cats have become increasingly more popular while, at the same time restrictions on their freedom have also increased due, for one example, to "leash" laws and, for another example, to the location of the residence of the owners, apartment houses in a city.

As a consequence, for many owners of cats and dogs, it is necessary to provide some means indoors for the use by the animals in eliminating body wastes. Such animals may be trained to use newspapers, boxes of sand or sawdust for that purpose but real problems existed in waste disposal, masking or eliminating objectionable odors, and the scattering of the litter as the result of "covering" scratching that is instinctive with such pets.

In order to minimize the problems attendant the proper care of animals that are confined indoors, various proposals primarily for cats, have been made both as to more suitable litter material and as to litter boxes. Available at the present time are litter boxes for cats provided with liners that enable the used litter to be conveniently handled in its disposal. In addition, deodorants are available to mask the odors that develop on the use of the litter.

At the present time, most owners of pets are attentive to the health of their animals and they see to it that not only are required and desirable "shots" given their pets but also that, when their pets show signs of illness, a veterinarian is consulted.

One disease, indicated by small amounts of blood in the urine is relatively common, particularly with male cats urinating in litter. This disease is an infection of the urinary tract and is often fatal if it affects the bladder. Early detection and treatment is obviously desirable and like certain other diseases or conditions, such detection results if an appropriate urinalysis is made. The pH of the urine, occult blood, protein percentage and glucose levels are typical but by no means the only indications of disease or of the general condition of an animal that may be detected from urinalysis.

Comparable tests are routinely made in the case of humans and urine test strips, available for that purpose, are made by Ames Company, a Division of Miles Laboratories, Inc., of Elkart, Indiana, in accordance with certain of its patents. See for example U.S. Pat. No. 3,438,737 for protein testing, U.S. Pat. Nos. 2,986,606, 3,050,375, 3,123,443, 3,164,534, and 3,453,180 for determining glucose levels, and U.S. Pat. Nos. 3,012,976, 3,092,463, 3,252,762, and 3,290,117 for occult blood testing. For pH testing, see U.S. Pat. No. 3,122,420.

The making of such tests, in the case of animals is difficult, first, in the problem of collecting urine and second, in providing that such tests can be made early and often enough to minimize the chance of a change in the general condition of the pet being undetected until too late.

THE PRESENT INVENTION

The general objective of the present invention is to provide a litter for use by pet animals that enables at least one urine test to be made as an incident of its use by the animal, an objective attained with a package having a body of litter material within a container of waterproof material and for use by the pet after the package has been opened to expose litter substantially throughout the area of the container when disposed for use. The litter consists of particles of absorbent material that is chemically neutral when wet and the package also includes testing means of an indicator type changing in color if wetted by urine containing a color-changing reactant indicative of an unfavorable health condition. The testing means includes at least one unitary portion so located that when the container is open, the testing means is at least under the positions the animal occupies while urinating and of an area such as to be wetted at least in part by particles that have become wetted by urine in the normal use of the litter by the animal and to be subject to the reactant throughout a predetermined time. When the litter is to be changed, examination will show whether or not the testing means has changed color and thereafter the package disposed of with other trash.

While it is, of course, essential to provide that the indicating means will be wetted with urine during the period the litter is in use and sometimes it is sufficient to note simply that a generally describable color has appeared, it is usually important to equate the actual color to meaningful terms because the intensity of the color reflects the percentage of the reactant in the urine. To enhance the accuracy of the test or tests, it is necessary that they be made as soon as possible after the animal has urinated. Since it is usually desired that the litter be changed not oftener than every other day, the portions of the testing means are of an area such that they are seldom completely wetted even at the time of litter change so that fairly freshly reacted spots will then be present.

In the case of a urinalysis based on used litter it is also essential that the testing means be capable of being positioned in close proximity to a color chart and in accordance with one embodiment of the invention testing means consists of a plurality of test pieces of absorbent material of convenient size and shape mixed in the litter. In accordance with another embodiment of the invention, the testing means are applied to an insert positionable in the bottom of the container and in yet another embodiment of the invention, the testing means are applied directly to the bottom of the container in which case, with container material that is transparent, the color change may be noted and comparisons made from the outside of the container with the container closed with the litter inside.

While any type of litter material may be used that is suitably absorbent and chemically neutral when wet, another objective of the invention is to increase the ease and convenience of litter disposal, an objective attained by the use of pieces of any paper stock that disintegrates so readily in an excess of water that used litter may be flushed safely into a domestic sewerage system, if desired, leaving only the container to be disposed of with the trash.

Another objective of the invention is to make possible multiple tests, an objective attained with the testing means of at least two types of indicators, each responsive to a reactant which if present in the urine will cause a color change, the color change for each type being distinguishable from that of any other type. In practice, the volume of the indicating means for any one type may be within a range of from 3 to 15 percent of the total litter volume so that with even three types of testing means, some of each type will typically be below said positions.

A further objective of the invention is to provide for the convenient handling of the litter both before and after use by the pet, an objective attained with a sealed litter container having a wall provided with tear lines enabling the container, when opened, to fit a tray of particular dimensions and provided with lengthwise slots, the opened container having flaps that may be tucked into the slots or otherwise attached to the holder.

BRIEF DESCRIPTION OF THE DRAWINGS

In the accompanying drawings there is shown preferred embodiments of the invention of which FIG. 1 is a perspective view of a litter container in the form of a bag;

FIG. 2 is a like view of a holder or tray therefor;

FIG. 3 is a perspective view of an opened litter bag secured in the tray;

FIG. 4 is a section, on an increase in scale, taken approximately along the indicated line 4—4 of FIG. 3;

FIG. 5 is a perspective view of a roll of paper on a further increase in scale, the paper being uniformly impregnated with an indicator of a type changing color in response to a particular reactant that may be present in the pet's urine;

THE PREFERRED EMBODIMENTS OF THE INVENTION

Figure 6:
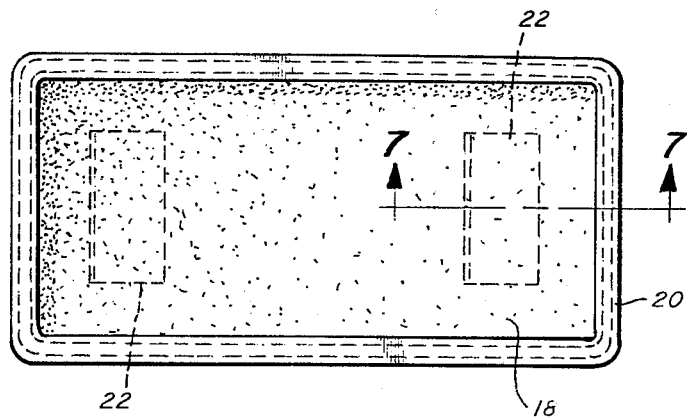
FIG. 6 is a plan view of an opened litter package in accordance with another embodiment of the invention and positioned and held in a tray by a frame, the testing means detachably secured to the bottom of the litter container.

In the embodiment of the invention illustrated by FIGS. 1-4 a container 10 is shown as a rectangular, sealed bag of a flexible and preferably clear plastic, polyethylene, for example, and filled with an absorbent body of litter, generally indicated at 11. A holder, desirably a tray 12, has lengthwise slots 13 near the upper edges of its side and end walls and is dimensioned to hold a bag 10 containing a volume of litter that provides an adequate layer of litter in the tray 12 and the tray 12 is of sufficient depth to minimize the escape of litter therefrom as the animal scratches.

The wall 10A of the bag 10 has a central, lengthwise score line 14 with score lines 14A and 14B at each of its ends angled away from each other towards an appropriate corner of the bag but terminating short thereof. When the bag 10 is opened along the score lines and fitted into the holder 12, the material between the ends of the score lines 14A and 14B and the sides and ends of the bag 10 and corresponding portion of the other wall 10B of the bag 10 become side and end walls of a liner for the tray 12 as will be apparent from FIGS. 3 and 4. The remainder of the upper wall 10A establishes side and end flaps 15 and 16 that overlie the side and end walls, respectively, of the tray 12 that may be tucked into the appropriate slot or slots 13 to secure the thus established lining in place. Used litter is easily disposed of by releasing the flaps 15 and 16 from the tray and then removing the container 10 with the used litter held therein.

The absorbent litter body 12 consists of small pieces of paper, preferably mainly shredded pieces and the paper stock is of any type that is chemically neutral when wet and that disintegrates so readily in an excess of water that used litter may be safely flushed into the household sewerage system, leaving only the bag 12 to be disposed of. A preferred source of the litter paper is toilet paper ends and unprinted newspaper stock.

A substantial but minor percentage of the pieces are treated in whole or in part with an indicator that is a test, when wetted with the animal's urine for a particular reactant contained therein, providing information of value in determining the general health of the animal or the presence of a particular disease. Such pieces are hereinafter referred to as the indicating means.

While it would be possible to provide litter in which all the pieces thereof were so treated, indicator costs are, of course, important considerations. In addition, there may be several different indicators incorporated in the litter. For example, the litter may contain, in the case of that for use by dogs or cats, indicators for occult blood, protein percentage, and the pH of the urine as the most common of the urine tests. In the case of dogs, the litter may also contain testing means responsive to glucose. An important reason for there being only a minor percentage of indicator or indicators in the litter is that test pieces that differ markedly in color from the great majority of the paper pieces are more quickly and easily noted. It is, however, necessary that the test pieces be so distributed throughout the mass of the litter body that in the normal use thereof by the pet, at least some test pieces for each reactant will become wetted with the urine.

The litter may be sprayed with an indicator or the litter may be formed by mixing litters that have been treated with different indicators in which cases, the test pieces may be parts of untreated pieces. It is preferred, however, to pretreat a long strip of paper of the above referred-to type, see FIG. 5, by saturating it with a selected indicator and then, when the strip is dry, winding it into a roll 17 from which small pieces of a desired size may be cut or torn and added in a predetermined ratio to a mass of untreated paper pieces. This procedure ensures that the test pieces for each indicator will uniformly react on becoming wetted with urine so that the depth of the color change will be a true test of the strength of the detected reactant and, additionally, that the test pieces are of a size and shape different from the remaining litter.

In use, the litter bag 10 is opened and placed in a tray 11 in the manner previously described and is desirably replaced on a regular basis, each day or every other day for examples. The bag containing the used litter is easily carried to enable its contents to be dumped therefrom and flushed into the sewerage system. As an incident of thus disposing of the used litter, the person so doing will look for any colored test pieces and such are readily seen.

If the animal has been treated by a veterinarian, the veterinarian will have instructed the pet's owner as to what to look for. If the animal has been in good health, any color changes of the test pieces from the normal color thereof will be obvious to the pet's owner who can then consult with the veterinarian, thus ensuring early detection and treatment of a condition or disease. While the invention has been discussed primarily in connection with cats, it is equally well suited for use in the care of other animal pets.

While the litter above described is preferred because it can be disposed of via the domestic sewerage system, the package may be disposed of with other household trash. In addition, it requires the incorporation of the testing means with the litter and the selection and removal from the used litter of test pieces showing a color change for comparison with a color chart, desirably by the owner of the pet animal. While this is easily done when the indicating means is of relatively large size such as pieces or strips of paper, many people would find this procedure objectionable.

Figure 7:
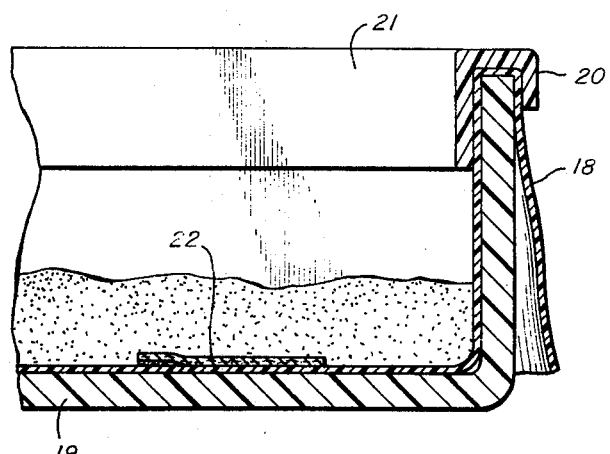
FIG. 7 is a section taken approximately along the indicated line 7—7 of FIG. 6.
Figure 8:
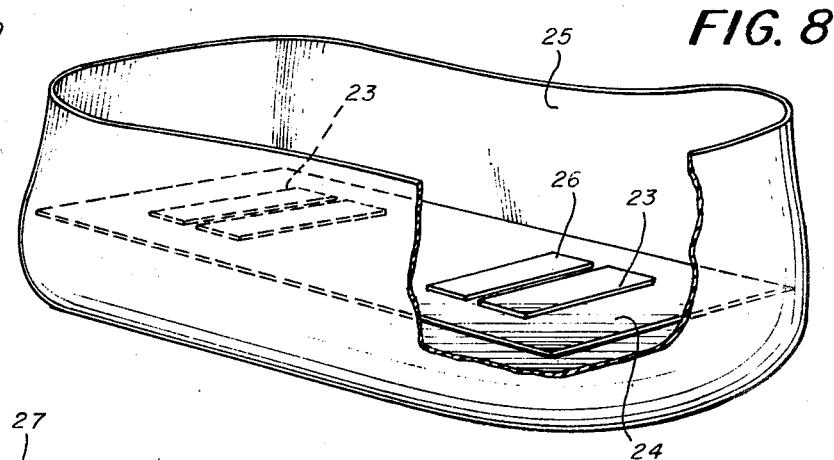
FIG. 8 is a perspective view of another embodiment of the invention in which the indicating means are on an insert positioned in the bottom of the litter container.

These two considerations make it preferable that, see FIGS. 6–8, that the container be a bag 18, desirably sealed and of a clear flexible plastic, polyethylene, for example, and oblong in cross section and dimensioned to fit the tray 19 and with its sides draped over the sides of the tray and held by a retaining frame 20 having a depending flange 21 fitting within the tray 19 and preventing the thus disposed sides of the bag from being dislodged by the pet while using the litter. While the used litter, if of the preferred type, may be dumped from the bag and flushed into the sewerage system, such a bag is so dimensioned relative to the volume of the litter packaged therein, that after use, its mouth can be closed with a tie or otherwise so that the sealed container with the used litter therein, may be conveniently disposed of with household trash, if preferred or as is necessary with other litter materials.

With either type of container, it is preferred that the testing means be in strip form and located within the litter to be wetted by the urine in the positions the animal may occupy in the tray while urinating, typically adjacent the ends of the tray.

As suggested by FIG. 6, strips 22 of testing means may be adhered to the bottom of the bag preferably in a manner permitting their detachment or the testing means may be formed as at 23 on a relatively large insert 24 in the container 25 as suggested by FIG. 8 thus to be sufficiently self-anchoring so as not to be displaced during the use of the litter. A color chart 26 may be printed on the insert adjacent each of the testing means 23.

Figure 9:
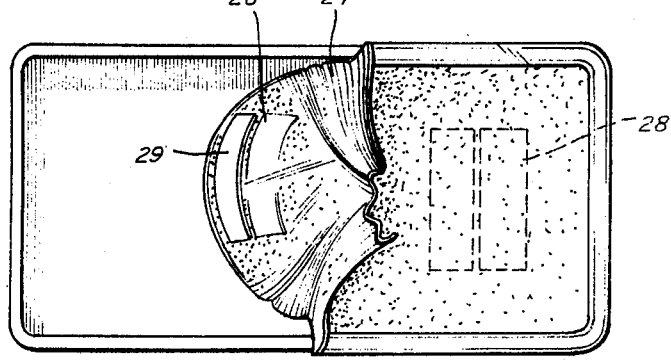
FIG. 9 is a view, similar to FIG. 6, illustrating yet another embodiment of the invention in which the indicating means are applied to the inner surface of the bottom of the container.

It is preferred, however, that the testing means be applied directly on the sheet material from which the bags or other containers 27 are formed in position to be on the inner surface of the bottoms when the litter packages are placed in the trays and opened as is illustrated by FIG. 9. The strips of the thus formed testing means being indicated at 28. This is the preferred construction with any and all litters as it enables the container of used litter to be closed and whether or not a color change has occurred can be observed through the bottom of the bag and if desired, and as indicated in FIG. 9, a color chart 29 may be printed on the bottom of the bag adjacent each strip 28 to facilitate comparison.

The indicators used have been those made by Ames Company and for pH testing the indicator was 0.14% w/w methyl red; 2.8% w/w bromthymol blue; 97% w/w non-reactive ingredients. In the case of glucose testing, the indicator was 4% w/w glucoseoxidase (0.4 I.U); 0.4% w/w peroxidase (900 I.U); 3.8% w/w orthotolidine; 64% w/w buffer; 27.8% w/w non-reactive ingredients. In the case of occult blood, the indicator was 7.8% cumene hydroperoxide; 1.3% w/w othotolidine; 36.1% w/w buffer; 54.8% w/w non-reactive ingredients. In the case of testing for protein, the indicator was 0.2% w/w tetrabromphenol blue; 99.8% w/w buffer.

As the manufacturer advises that the indicator must be protected against light, heat and ambient moisture to prevent alteration of their reactivity, it will be appreciated that it is necessary to have at least a large part of the testing means below the surface of the litter and of a large enough area so that, when the litter is changed, part of the testing means will have become wetted a reasonably short time before.

By way of summary, the preferred litter package for domestic uses consists of a clear waterproof container for a body of litter of pieces of paper that will so readily disintegrate in water that the litter may be disposed of via the domestic sewerage system and the testing means are applied in strip form directly on the inner surface of the bottom of the container under the positions occupied by the pet animal while urinating.

I claim:

1. A litter package comprising a container of transparent waterproof material, a body of litter within the container for use by a pet animal after the package has been opened to expose the litter with the litter covering the bottom of the container when disposed for use, said body consisting of absorbent particles that are chemically neutral when wet, and testing means within the container and of an indicator type changing color if wetted by urine containing a particular color-changing reactant indicative of an unfavorable current health condition of the animal, said testing means so located within the container that when the container is disposed for use, test areas are provided where they will become wetted by urine in any position the animal will normally occupy while urinating during a predetermined time interval, each test area dimensioned to provide a colored signal, if said reactant is present in the animal's urine, that is readily distinguishable from the remainder of the litter body during the disposal thereof.

2. The litter package of claim 1 in which the testing means includes different types of indicators, each indicator changing color if wetted by urine containing a reactant different from that to which any other type responds.

3. The litter package of claim 1 in which the testing means includes a plurality of test pieces in the form of small pieces of paper.

4. The litter package of claim 2 in which each type of testing means includes a plurality of test pieces.

5. The litter package of claim 1 in which the testing means are fixed on the bottom of the container.

6. The litter package of claim 1 in which the testing means is applied to the inside of the bottom of the container and the container material is sufficiently transparent to enable the color thereof to be visible from the outside.

7. The litter package of claim 6 and a color chart on the outside of the bag bottom for comparison with the color of the testing means after use of the litter by the animal to approximate the concentration of the reactant.

8. The litter package of claim 1 and at least one insert positioned on the bottom of the container and dimensioned to resist any substantial displacement during use of the litter by the animal and testing means is applied to the insert.

9. The litter package of claim 1 and inserts detachably secured to the inner surface of the bottom of the container and the testing means is applied to the inserts.

10. The litter package of claim 9 in which the testing means are also small pieces of paper treated with the indicator.

11. The litter package of claim 9 and in which the testing means constitutes approximately 3 to 15 percent of the litter volume.

12. The litter package of claim 1 in which the testing means contains different types of indicators each consisting of small pieces of paper treated with an indicator different from any other indicator and constituting approximately three to fifteen percent of the litter volume.

* * * * *